United States Patent [19]

Inoue et al.

[11] Patent Number: 4,722,959

[45] Date of Patent: Feb. 2, 1988

[54] FLAME-RETARDANT OLEFIN POLYMER COMPOSITION

[75] Inventors: Takashi Inoue; Masazi Sunada; Satoru Kaneko; Motohide Okamoto, all of Yokohama, Japan

[73] Assignee: Nippon Petrochemicals Co., LTD., Tokyo, Japan

[21] Appl. No.: 877,798

[22] Filed: Jun. 24, 1986

[30] Foreign Application Priority Data

Jun. 25, 1985 [JP] Japan .................................. 60-138108
Mar. 28, 1986 [JP] Japan .................................. 61-68745

[51] Int. Cl.$^4$ .............................................. C08K 3/22
[52] U.S. Cl. ............................. 524/412; 174/110 PM; 524/409; 524/410; 524/411; 524/436; 524/437
[58] Field of Search ............... 524/409, 410, 411, 412, 524/437, 436; 525/301, 221, 240; 174/110 PM

[56] References Cited

U.S. PATENT DOCUMENTS 3,928,497 12/1975 Ohmori et al. ..................... 525/301
4,147,690 4/1979 Rich ................................. 524/437
4,147,741 4/1979 Slama et al. ...................... 524/412

*Primary Examiner*—Veronica P. Hoke
*Attorney, Agent, or Firm*—Fisher, Christen & Sabol

[57] ABSTRACT

The present invention provides a flame-retardant olefin polymer composition comprising at least components (a), (b) and (c) in which in 100 parts by weight of a resin component which is conmposed of (a) 99 to 60% by weight of an ethylene-α-olefin copolymer having a density of 0.86 to 0.91 g/cm$^3$, a boiling n-hexane insoluble matter of 10% by weight or more and a maximum peak temperature of 100° C. or more in terms of differential scanning calorie meter and (b) 1 to 40% by weight of an olefin polymer modified with an unsaturated carboxylic acid or its derivative;

(c) 20 to 200 parts by weight of an inorganic flame retarder is contained; and an electrical material employing the aforesaid composition.

17 Claims, 1 Drawing Figure

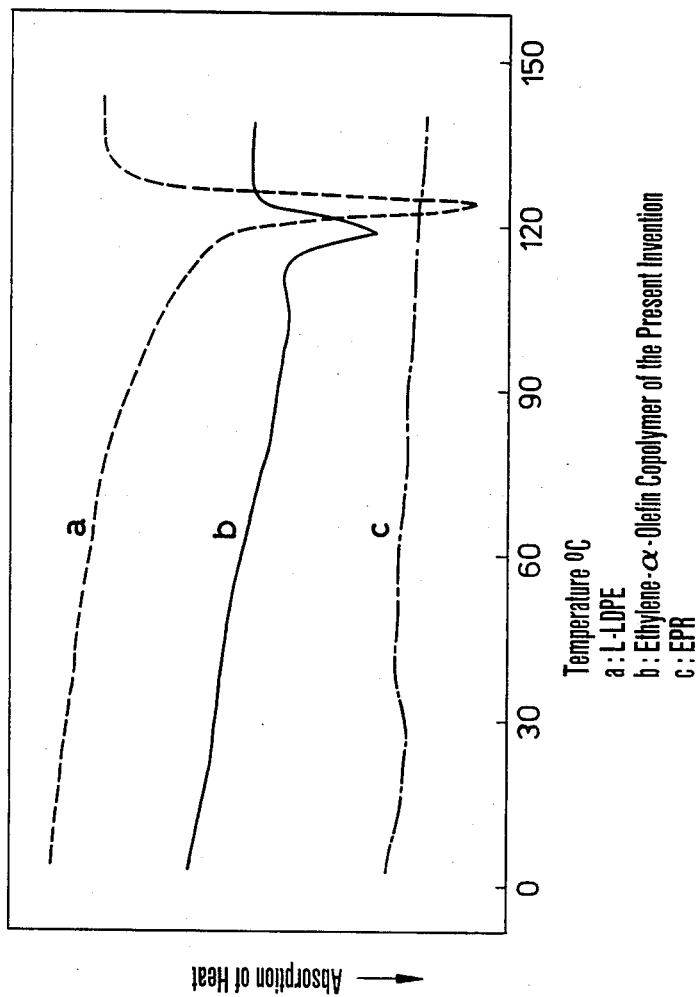

FLAME-RETARDANT OLEFIN POLYMER COMPOSITION

BACKGROUND OF THE INVENTION (1) Field of the Invention

The present invention relates to a flame-retardant olefin polymer composition excellent in heat resistance and mechanical strength which is composed basically of an ethylene-α-olefin copolymer having a density of 0.86 to 0.91 g/cm$^3$, a boiling n-hexane insoluble matter of 10% by weight or more and a maximum peak temperature of 100° C. or more in terms of differential scanning calorie meter and an olefin polymer modified with an unsaturated carboxylic acid or its derivative, and an electrical material using the above mentioned composition.

(2) Description of the Prior Art

A polyethylene is excellent in physical and chemical properties and thus is often utilized in many fields as household and industrial aritcles which are molded into films, sheets, pipes, containers and the like by various molding methods such as extrusion, injection molding and rotary molding.

The polyethylene is easily combustible, and accordingly methods for rendering it flame-retardant have heretofore been suggested.

The most general method of these suggestions intends to obtain flame-reatardant properties by adding a flame retarder containing a halogen or phosphorus to the polyethylene. The degree of its flame retardance is heightened along with the increase in an amount of the flame retarder to be added. However, it is known that the increase in the amount of the flame retarder brings about the deterioration in mechanical strength and workability and additionally impairs flexibility and low-temperature resistance disadvantageously. Further, from the viewpoint of fire prevention, it is required that the flame-retardant composition has higher flame retardance, and such a requirement is imposed as duty in some districts as a recent tendency. The above mentioned requirement can be satisfied with non-environmental pollution type inorganic flame retarders such as magnesium hydroxide and aluminum hydoxide which will not generate a harmful gas and will emit a less flame in the time of combustion, and their demand is rapidly getting larger (these techniques are described in, for example, Japanese Patent Provisional Publication Nos. 132254/1976, 136862/1981 and 13832/1985).

However, the polyethylene which is now commercially available is particularly poor in the acceptance of the inorganic flame retarder, so that its flame-retardant effect is low. Such a type of polyethylene additionally has the drawback that when a content of the inorganic flame retarder is heightened, mechnical strength, flexibility and workabilty will deteriorate, so that it will be impracticable. On the other hand, for the purpose of heightening the content of the inorganic flame retarder, a technique of using a flexible resin such as an ethylene-vinyl acetate copolymer, an ethylene-ethyl acrylate copolymer, a chlorinated polyethylene or an ethylene-propylene copolymer rubber is well known. However, such a technique is poor in mechanical strength such as tensile strength and heat resistance.

SUMMARY OF THE INVENTION

An object of the present invention is to provide a non-environmental pollution type flame-retardant composition having a higher flame retardance in which mechanical strength and workability are not poor and flexibility and low-temperature resistance are not impaired and which do not generate any harmful gas and emit a less flame in the time of combustion, or a self-extinguishing flame-retardant composition having a high flame retardance of V-1 or V-0 at UL-94.

Another object of the present invention is to provide an electrical material such as an insulator or a sheath for electric wires or electric cables, a cable protective cover, a packing, a sealing medium, an insulating garment, an insulating sheet or film, a pipe, for example, a flexible pipe or a protective pipe, or an article molded by injection molding or a master batch.

The present invention provides a flame-retardant olefin polymer composition in which in 100 parts by weight of a resin component which is composed of (a) 99 to 60% by weight of an ethylene-α-olefin copolymer having a density of 0.86 to 0.91 g/cm$^3$, a boiling n-hexane insoluble matter of 10% by weight or more and a maximum peak temperature of 100° C. or more in terms of differential scanning calorie meter and (b) 1 to 40% by weight of an olefin polymer modified with an unsaturated carboxylic acid or its derivative;

(c) 20 to 200 parts by weight of an inorganic flame retarder is contained;

and an electrical material using the composition.

DESCRIPTION OF THE PREFERRED EMBODIMENTS

An ethylene-α-olefin copolymer which is a component (a) of the present invenion is a copolymer of ethylene and an α-olefin having 3 to 12 carbon atoms. Concrete examples of the α-olefin include propylene, butene-1, 4-methylpentene-1, hexene-1, octene-1, decene-1 and dodecene-1. Of these compounds, propylene and butene-1 are particularly preferred, and butene-1 is most preferable. It is preferred that a content of the α-olefin in the ethylene-α-olefin copolymer is 5 to 40 mol%.

Now, the process for manufacturing the copolymer of ethylene and the α-olefin used in the present invention will be described.

Firstly, a catalyst system used is prepared by combining a solid catalyst component containing magnesium and titanium with an organic aluminum compound. The solid catalyst component is an inorganic solid compound containing magnesium in which a titanium compound is supported in a known manner. Examples of the inorganic solid compounds include metallic magnesium, magnesium hydroxide, magnesium carbonate, magnesium oxide and magnesium chloride; a double salt, a double oxide, a carbonate, a chloride or a hydroxide containing a magnesium atom and a metal selected from silicon, aluminum and calcium; and an inorganic solide compound treated or reacted with an oxygen-containing compound, a sulfur-containing compound, an aromatic hydrocarbon or a halogen-containing material.

Examples of the above mentioned oxygen-containing compounds include organic oxygen-containing compounds such as water, an alcohol, a phenol, a ketone, an aldehyde, a carboxylic acid, an ester, a polysiloxane and an acid amide; and inorganic oxygen-containing compounds such as a metallic alkoxide and an oxychloride of a metal. Examples of the sulfur-containing compounds include organic sulfur-containing compounds such as a thiol and a thioether, and inorganic sulfur-containing compounds such as sulfur dioxide, sulfur trioxide and sulfuric acid. Examples of the aromatic hydrocarons include monocyclic and polycyclic aromatic hydrocarbons such as benzen, toluene, xylene, anthracene and phenanthrene. Further, examples of the halogen-containing compounds include chlorine, hydrogen chloride, a metallic chloride and an organic halide.

Examples of the titanium compounds include a halide, an alkoxyhalide, an alkoxide and a halogenated oxide of titanium. As the titanium compounds, tetravalent and trivalent titanium compounds are preferred. The concrete preferable examples of the tetravalent titanium compound are represented by the general formula $Ti(OR)_nX_{4-n}$ wherein R is an alkyl group having 1 to 20 carbon atoms, an aryl group or an aralkyl group; X is an halogen atom, and n is a value satisfying the relation of $0 \leq n \leq 4$. Preferable concrete examples of these titanium compounds include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentooxytrichlorotitanium, monophenoxytrichlorotitanium, diphenoxydichlorotitanium, triphenoxymonochlorotitanium and tetraphenoxytitanium.

An example of the trivalent titanium compound is a trihalogenated titanium which can be prepared by chemically reducing a tetrahalogenated titanium such as titanium tetrachloride or titanium tetrabromide with hydrogen, aluminum, titanium or an organic metallic compound of a metal in groups I to III of the periodic table. In addition, another usable exemplary compound is a trivalent titanium compound which is obtained by reducing, with an organic metallic compound of a metal in group I to III of the periodic table, a tetravalent halogenated alkoxytitanium represented by the geneneral formula $Ti(OR)_mX_{4-m}$ wherein R is is an alkyl group having 1 to 20 carbon atoms, an aryl group or an aralkyl group; X is an halogen atom, and m is a value satisfying the relation of $0 \leq m \leq 4$.

Of these titanium compounds, the tetravalent titanium compounds are particularly preferred.

As another example of the catalytic system, there is a combination of the following reaction product with an organic aluminum compound, the reaction product being that which is prepared by reacting an organic magnesium compound such as a so-called Grignard compound, which is the solid catalytic component, with the titanium compound. Examples of the above mentioned organic magnesium compounds include those which are prepared by modifying organic magnesium compounds having the general formula RMgX, $R_2Mg$, RMg(OR) (wherein R is an organic residue having 1 to 20 carbon atoms, and X is a halogen atom) and the like, their ether complexes or their organic magnesium compounds with other organic metallic compounds such as an organic sodium, an organic lithium, an organic potassium, an organic boron, an organic calcium and an organic zinc.

Another example of the catalytic system is a combination of the following solid material and an organic aluminum compound, this solid material being that which is prepared by bringing an inorganic oxide such as $SiO_2$ or $Al_2O_3$ which is the solid catalytic component into contact with a solid catalytic component containing at least magnesium and titanium. CaO, $B_2O_3$ and $SnO_2$ as well as their double oxides can also used as the inorganic oxides without any trouble, in addition to $SiO_2$ and $Al_2O_3$ above mentioned. The contact of the inorganic oxide with the solid catalytic component containing magnesium and titanium can be accomplished by a known manner. That is, the aforesaid contact process can be carried out by reacting these materials at a temperature of 20° to 400° C., preferably 50 to 300° C. usually for 5 to 20 hours in the presence of or in the absence of an inactive solvent, performing their cogrinding treatment, or reacting them in the combination of these methods.

In this catalytic system, the titanium compound may be used as its adduct with an organic carboxylate, and the inorganic solid compound containing magnesium may be used after subjected to a contact treatment with an organic carboxylate. Additionally, the organic aluminum compound may be employed as its adduct with the organic carboxylate without any problem. In every case, moreover, it can also be achieved without any inconvenience to make use of the catalytic system prepared in the presence of the organic carboxylate.

Examples of usable organic carboxylates include a variety of aliphatic, alicyclic and aromatic carboxylates, and their preferable ones are the aromatic carboxylates having 7 to 12 carbon atoms. Concrete examples of these carboxylates include alkyl esters such as methyl and ethyl esters of benzoic acid, anisic acid and toluic acid.

Concrete examples of the organic aluminum compounds which are to be combined with the above mentioned solid catalytic component are preferably organic aluminum compounds represented by the general formulae $R_3Al$, $R_2AlX$, $RAlX_2$, $R_2AlOR$, $RAl(OR)X$ and $R_3Al_2X_3$ wherein R is an identical or different alkyl group having 2 to 20 carbon atoms, an aryl group or an aralkyl group, and X is an halogen atom. Concrete examples of the organic aluminum compounds include triethylaluminum, triisobutylaluminum, trihexylaluminum, trioctylaluminum, diethylaluminum chloride, diethylaluminum ethoxide, ethylaluminumsesqui chloride and their mixtures.

An amount of the organic aluminum compound to be used is not particularly limited, but it is usually 0.1 to 1,000 mol times as much as that of the titanium compound.

If the above mentioned catalytic system is brought into contact with an α-olefin and is then used for the polymerization reaction, its polymerization activity can be improved remarkably, whereby a more stable operation than in the case of no treatment can be carried out. As the α-olefin used in this treatment, a variety of olefins can be utilized, but preferable ones have 3 to 12 carbon atoms, and more preferable ones have 3 to 8 carbon atoms. Concrete examples of these α-olefins include propylene, butene-1, pentene-1. 4-methylpentene-1, hexene-1, octene-1, decene-1 and dodecene-1 and their mixtures. The contact treatment of the catalytic system with the α-olefin is carried out within a wide temperature range, e.g., in the range of 0° to 200° C., preferably 0° to 110° C., for a period of 1 minute to 24 hours. An amount of the α-olefin can be selected from a wide range, but in general, it is within the range of 1 to 50,000 grams, preferably 5 to 30,000 grams, per gram of the solid catalytic component, but it is more preferred that the α-olefin in an amount of 1 to 500 grams per gram of the solid catalytic component takes part in the reaction. In this time, a presssure during the contact treatment can be ortionally selected, but it is preferably carried out under a pressure of −1 to 100 kg/cm²·G. In treating the α-olefin, the total amount of the organic aluminum compound to be used may be combined with the solid catalytic component and may then be brought into contact with the α-olefine. Alternatively, a part of the used organic aluminum compound may be combined with the solid catalytic component and may be brought into contact with the α-olefin, and the remaining organic aluminum compound may be separately added thereto in the time of the polymerization, thereby performing a polymerization reaction. Further, when the catalytic system is contacted with the α-olefin, a hydrogen gas may suitably be present, and it is also acceptable that an inert gas such as nitrogen, argon or helium may be coexistent there.

The above mentioned polymerization reaction can be carried out like a polymerization reaction of an olefin by the use of a usual Zeigler catalyst. That is, the reaction can be performed substantially in the condition of being free from oxygen, water and the like in a gaseous phase or in the presence of an inert solvent or by the utilization of the monomer itself as a solvent. With regard to the conditions of the olefin polymerization, a temperature is within the range of 20° to 300° C., preferably 40° to 200° C., and a pressure is within the range of ordinary pressure to 70 kg/cm²·G, preferably 2 or 60 kg/cm²·G. A molecular weight of the polymer to be produced can be adjusted by changing polymerization conditions such as a polymerization temperature, a molar ratio of the catalyst and the like to some extent, but it can be effectively achieved by adding hydrogen to the polymerization system. Needless to say, a polymerization reaction comprising two more steps may be carried out without any problem in which the reaction conditions such as a hydrogen concentration, polymerization temperature and the like are different.

The ethylene-α-olefin copolymer prepared in this way which is the component (a) of the present invention should have the following requirements:

(A) A density is from 0.86 to 0.91 g/cm³.
(B) A boiling n-hexane insoluble matter is 10% by weight or more.
(C) A maximum peak (Tm) is 100° C. or more on the basis of differential scanning calorie meter (DSC).

When the above mentioned desity is in excess of 0.91 g/cm³, the prepared composition might have no flexibility; when it is less than 0.86 g/cm³, the melting point of the composition will be low and its heat resistance will also be poor.

Further, when the boiling n-hexane insoluble matter of the ethylene-α-olefin copolymer is less than 10% by weight, an amorphous material and a low-molecular component will increase, so that oil resistance and strength of the final product will deteriorate.

On the other hand, in the case that the maximum peak temperature (Tm) by the differential scanning calorie measurement (DSC) is less than 100° C., heat resistance of the product will be poor.

A melt index (hereinafter referred to simply as MI) of the ethylene-α-olefin copolymer is within the range of 0.05 to 50 grams per 10 minutes, preferably 0.1 to 20 grams per 10 minutes.

In particular, in the case that the product is employed as an electrical material, it is preferred that the MI is within the range of 0.3 to 5 grams per 10 minutes.

Measuring procedures of the boiling n-hexane insoluble matter and the DSC regarding the present invention are as follows:

(Measurement of Boiling n-Hexane Insoluble Matter)

A sheet of 200 μm in thickness is molded by the use of a hot press, and three small sheets each having a length of 20 mm and a width of 30 mm are cut out from the molded sheet. Each of these sheets is set on a double pipe type Soxhlet's extractor, and extraction is then carried out with boiling n-hexane for 5 hours. An n-hexane insoluble matter is afterward taken out therefrom and is dried (under vacuum, at 50° C. for 7 hours), and the boiling n-hexane insoluble matter is the calculated by the following formula:

Boiling n-hexane insoluble matter (wt %) =

(weight of used extraction sheet/weight of unused extraction sheet) × 100 (wt %)

(Measurement of DSC)

A sample having a weight of about 5 mg is taken out from a film of 100 μm thick molded by a hot press and is then set on a DSC apparatus, and a temperature of the latter is raised up to 170° C. and is then maintained at this temperature for 15 minutes. Afterward, it is cooled at a temperature drop rate of 2.5° C./min up to a level of 0° C. Next, the temperature is raised from this level up to 170° C. at a temperature rise rate of 10° C./min, and measurement is then carried out. A temperature at the position of a maximum peak which has appeared during the temperature rise from 0° to 170° C. is regarded as Tm.

The ethylene-α-olefin copolymer which is the component (a) of the present invention has a high crystalline portion and an amorphous portion together which are produced the copolymerization of ethylene with the α-olefin. In consequence, the ethylene copolymer possesses properties together such as strength and heat resistance which a conventional crystalline polyolefin resin has and properties such as rubber-like elasticity and flexibility which the amorphous polymer has.

Heretofore, as this kind of ethylene copolymers which are commercially available, there are a straight-chain low-density polyethylene (hereinafter referred to simply as L-LDPE) and an ethylene-α-olefin copolymer rubber (hereinafter referred to simply as EPR).

However, the ethylene-α-olefin copolymer which is the component (a) of the present invention is definitely different from the conventional straight-chain low-density polyethylene or the ethylene-α-olefin copolymer rubber which is prepared by using the solid catalytic component containing vanadium.

FIG. 1 shows the results of the crystal melting behavior of the various ethylene copolymers which were measured by the use of the differential scanning calorie meter (DSC).

As be apparent from the results in FIG. 1, the L-LDPE still has a high crystallinity and a higher flame retardance, and therefore when filled with plenty of an inorganic flame retarder, its flexibility will be lost, a low-temperature properties will be poor, with the result that it will be impracticable.

On the contrary, the EPR scarcely has the crystallinity, and even if the crystalline portion is present, it is very slight. Therefore, the maximum peak temperature (Tm) by the DSC is less than 100° C.

This fact indictates that the EPR cannot be used in applications requiring heat resistance, mechanical strength and the like.

The olefin polymer modified with the unsaturated carboxylic acid or its derivative which is the component (b) of the present invention is an olefine polymer modified with 0.05 to 10% by weight of the unsaturated carboxylic acid or its derivative in the presence of an organic peroxide, or a mixture of the modified polymer and the unmodified olefin polymer.

Examples of the usable olefine polymers include olefin homopolymers such as polyethylene, polypropylene, polybutene-1 and poly-4-methyl-pentene-1; mutual copolymers of ethylene, propylene, butene-1, 4-methyl-pentene-1, hexene-1 and octene-1; an ethylene-vinyl ester copolymer such as an ethylene-vinyl acetate compolymer; and copolymers of unsaturated carboxylic acids and unsaturated carboxylates such as an ethylene-acrylic acid copolymer, an ethylene-methacrylic acid copolymer, an ethylene-acrylate compolymer and an ethylene-methacrylate copolymer. The preferable olefin polymers are polyethylene, polypropylene, and a copolymer of ethylene and another α-olefin such as an ethylene-butene-1 copolymer, and the more preferable onlefin polymers are an ethylene homopolymer having density of 0.91 to 0.97 g/cm$^3$ and an ethylene-α-olefin copolymer and mixtures thereof.

In the present invention, the following rubbers may be used together with the above mentioned olefin polymers: Solid rubbers such as a polyisobutylene, a butyl rubber, an ethylene-propylene rubber, an ethylene-propylene-diene rubber, a styrene-butadiene rubber, a polybutadiene rubber, a chloroprene rubber, a urethane rubber, an ethylene-vinyl acetate copolymer rubber and a natural rubber; liquid rubbers such as a liquid polybutadiene, a synthetic rubber and a natural rubber; and mixtures thereof. On the other hand, examples of the unsaturated carboxylic acids include monobasic acids and dibasic acids such as acrylic acid, methacrylic acid, maleic acid, fumaric acid, crotonic acid, itaconic acid and citraconic acid.

Further, the derivatives of the unsaturated carboxylic acids include metallic salts, amides, imides, esters and anhydrides of the above mentioned unsaturated carboxylic acids, but of these compounds, maleic anhydride is most preferable.

An amount of the unsaturated carboxylic acid or its derivative (hereinafter referred to simply as the unsaturated carboxylic acid) which additively modifies the olefin polymer is within the range of 0.05 to 10% by weight, preferably 0.1 to 5% by weight, and their thermal reaction is carried out in the presence of an organic peroxide.

The above-mentioned reaction may be carried out optionally, for example, by melting and mixing the materials in the absence of any solvent in an extruder or in a kneader of a Banbury mixer or the like, or by thermally mixing the materials in an aromatic hydrocarbon solvent such as benzene, xylene or toluene or an aliphatic hydrocarbon solvent such as hexane, heptane or octane. However, from the viewpoints of high economy and simple operation, the implementation of the reaction in the extruder is preferred.

When an amount of the unsaturated carboxylic acid is in excess of 10% by weight, undesirable decomposition and crosslinking reaction will occur together with the addition reaction; when it is less than 0.05% by weight, the effect of the present invention will be not achieved sufficiently.

Examples of the usable organic peroxides include benzoyl peroxide, rauryl peroxide, azobisisobutyronitrile, dicumyl peroxide, t-butylhydro peroxide, α,α'-bis(t-butylperoxydiisopropyl)benzene, di-t-butyl peroxide, 2,5-di(t-butylperoxy)hexine, and an amount of the organic peroxide is within the range of 0.005 to 2.0 parts by weight, preferably 0.01 to 1 part by weight based on 100 parts by weight of the olefin polymer. When the amount of the organic peroxide is less than 0.005 part by weight, an effect of the modification will not appear vertically; when it is more than 2 parts by weight, it will be difficut to obtain an additional effect, and excessive decomposition and crosslinking reaction might occur disadvantageously.

A temperature for the above mentioned reaction is suitably selected considering the quality deterioration in the resin, the decomposition of the unsaturated carboxylic acid, the decomposition temperature level of the organic peroxide, but in general, the reaction temperature of 150° to 300° C. is employed.

In the present invention, an unmodified olefin polymer or an unmodified rubber may be suitably added to and mixed with the modified olefin polymer. A mixing weight ratio of the modified olefin: the unmodified olefin polymer is optional, but preferably 1:99 to 50:50, more preferably 10:90 to 45:55.

A blend proportion of the above mentioned component (b) to the component (a) is within the range of 1 to 40% by weight, preferably 5 to 20% by weight.

When the blend amount of the above mentioned component (b) is less than 1% by weight, the improvement in tensile strength will scarcely be obtained; when it is more than 40% by weight, the deterioration in elongation will be noticeable and tensile strength will be poor.

Examples of the inorganic flame retarders which are the component (c) of the present invention include aluminum hydroxide, magnesium hydroxide, zirconium hydroxide, basic magnesium carbonate, dolomite, hydrotalcite, calcium hydroxide, barium hydroxide, a hydrate of tin oxide, a hydrate of an inorganic metallic compound such as borax, zinc borate, zinc metaborate, barium metaborate, zinc carbonate, magnesium carbonate-calcium, calcium carbonate, barium carbonate, magnesium oxide, molybdenum oxide, zirconium oxide, tin oxide and red phosphorus. They may be used alone or in a combination of two or more thereof. Of these compounds, at least one selected from the group of magnesium hydroxide, aluminum hydroxide, basic magnesium carbonate, hydrotalcite has a good flame-retardant effect and is economically advantageous. A grain size of the flame retarder varies with its kind, but with regard to magnesium hydroxide, aluminum hydroxide and the like, the average grain size is preferably 20 μm or less, more preferably within the range of 0.3 to 5 μm.

An amount of the inorganic flame retarder is within the range of 20 to 200 parts by weight, preferably 40 to 150 parts by weight based on 100 parts by weight of the resin. When the amount of the flame retarder is less than 20 parts by weight, a flame-retardant effect of the product will be insufficient; when it is more than 200 parts by weight, the product will have poor mechanical strength, impaired elongation and deteriorated flexibility, and it will be brittle and poor in low-temperature properties.

In order to obtain a higher flame retardance than V-1 or V-0 of UL-94, i.e., a self-extinguishing flame-retardant composition, an organic flame retarder comprising a halogen compound as a component (d) and antimony trioxide or antimony pentoxide as a flame-retardant auxiliary are preferably mixed with the above mentioned resinous component and inorganic flame retarder so that a ratio of the organic flame retarder: the flame-retardant auxiliary may be within the ragne of 5:1 to 1:3 and so that the total amount of both the materials may be 100 parts by weight or less.

The usable organic flame retarders comprising the halongen compounds which are the components (d) of the present invention include a chlorine flame retarder and a bromine flame retarder. Further, as the flame-retarder auxiliaries, antimony trioxide and antimony pentoxide can be employed.

The organic flame retarder and the flame-retardant auxiliary should be used together, and their remarkable flame-retardant effect can be obtained, when a weight ratio of the organic flame retarder: the flame-retartant auxiliary is 1 to 5:1 to 3, preferably 1 to 3:1.

The noticeable effect due to the organic flame retarder and the flame-retardant auxiliary can be obtained, when the total amount of these materials is within the range of 10 to 100 parts by weight, preferably 20 to 50 parts by weight based on the total weight of the other components (a), (b) and (c).

Examples of the organic flame retarders comprising the halogen compounds include bromine series such as tetrabromobisphenol A (TBA), hexabromobenzene, decabromo diphenyl ether, tetrabromoethane (TBE), tetrabromobutane (TBB) and hexabromocyclodecane (HBCD); and chlorine series such as a chlorinated paraffin, a chlorinated polyphenol, a chlorinated polyethylene, diphenyl chloride, perchloropentacyclodecane and a chlorinated naphthalene.

Additionally, in the present invention, a phosphorus series flame-retarder may be used together.

The composition of the present invention is the flameretardant composition excellent in mechanical strength and heat resistance in which in 100 parts by weight of a synthetic resin component which is composed of 99 to 60% by weight of an ethylene-α-olefin copolymer having (a) a density of 0.86 to 0.91 g/cm$^3$, a boiling n-hexane insoluble matter of 10% by weight or more and a maximum peak temperature of 100° C. by defferential scanning calorie measurement and (b) 1 to 40% by weight of an olefin polymer modified with an unsaturated carboxylic acid or its derivative, (c) 20 to 200 parts by weight of an inorganic flame retarder is contained. In particular, the combination of the component (a) and the inorganic flame retarder permits increasing the receptive volume of the flame retarder and thus heightening the flame-retardant effect. Further, when the olefin polymer component (b) modified with the unsaturated carboxylic acid or its derivative is suitably added to the component (a), the component (b) has the function such as a coupling agent between the components (a) and (c) in order to outstandingly heighten a mutual compatibility, mechanical strength and heat resistance.

This fact enables the compositiom of the present invention to be desirably utilized as electrical materials such as insulating materials and outer covering materials for electrical wires and cables.

An inorganic filler which is an optional component used in the present invention may be powdery, plane, scaly, needle-like, spherical, hollow or fibrous, and concrete examples of the inorganic fillers include powdery fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; plane or scaly fillers such as mica, glass plate, sericite, pyrophyllite and metal foils such as aluminum flake and graphite; hollow fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

This inorganic filler can be used in an amount of about 100 parts or less by weight based on 100 parts by weight of the composition according to the present invention.

When the amount of the inorganic filler is in excess of 100 parts by weight, molded articles will be poor in mechanical strength such as shock strength disadvantageously.

In the present invention, when the above mentioned inorganic flame retarder or the inorganic filler is used, the surface of this inorganic material is preferably treated with an aliphatic acid such as stearic acid, oleic acid or palmitic acid, or its metallic salt, a paraffin wax, a polyethylene wax or its modified material, an organic silane, an organic borane, an organic titanate or the like.

In the present invention, predetermined amounts of the ethylene-α-olefin copolymer, the flame retarder, and if desired, the inorganic filler, additives and the like are melted and kneaded in an ordinary kneader such as a Banbury mixer, a pressure kneader, a kneading extruder, a biaxial extruder and rolls, and the resultant composition of the present invention can be supplied in the form of pellets or a masterbatch. In addition thereto, the above mentioned resin component may be subjected to a drive blending treatment with the flame retarder, additives and the like.

Furthermore, in the present invention, other additives may be added in so far as the effect thereof is not impaired remarkably, and examples of such additives include another synthetic resin, an antioxidant, a lubricant, various organic and inorganic pigments, an ultraviolet stabilizer, a dispersant, a copper de-activator, a neutralizer, a blowing agent, a plasticizer, a foam inhibitor, a crosslinking auxiliary, an improver for flow properties, an improver for weld strength and a nucleating agent.

Now, the present invention will be described in reference to examples.

(Used Resins)

Preparation of Component (a)

The component (a) was prepared by copolymerizing ethylene and butene-1 or propylene by the use of a solid catalytic component made from substantially anhydrous magnesium chloride, 1,2-dichloroethane or anthracene and titanium tetrachloride, and a catalyst comprising triethylaluminum.

(A) Ethylene-butene-1 copolymer (MI=1.0 g/10 min, density=0.905 g/cm$^3$)

(B) Ethylene-butene-1 copolymer (MI=0.8 g/10 min, density=0.900 g/cm$^3$)
(C) Ethylene-propylene copolymer (MI=0.5 g/10 min, density=0.890 g cm$^3$)

In the cases of comparative examples (D) Ethylene-butene-1 copolymer (MI=4 g/10 min, density=0.887 g/cm$^3$) (trade name: Toughmer A4085; Mitsui Petrochemical Industries, Ltd.)
(E) Ethylene-propylene copolymer (MI=1.9 g/10 min, density=0.86 g/cm$^3$) (trade name: EP02p; Japan Synthetic Rubber Co., Ltd.)

Component (b) (olefin polymer modified with an unsaturated carboxylic acid or its derivative)

(F) Ethylene-butene-1 copolymer (density=0.935 g/cm$^3$, MI=0.8 g/10 min) (Nippon Petrochemicals Co., Ltd.)
(G) Ethylene-butene-1 copolymer (density=0.922 g/cm$^3$, MI=1.0 g/10 min) (Nippon Petrochemicals Co., Ltd.)
(H) Ethylene-butene-1 copolymer (density=0.956 g/cm$^3$, MI=1.6 g/10 min) (Nippon Petrochemicals Co., Ltd.)

The above mentioned three ethylene-α-olefin copolymers (F), (G) and (H) were melted and kneaded together with 0.25% by weight of maleic anhydride and 0.02% by weight of an organic peroxide (trade name: Perhexyne 2,5B, Nippon Oils & Fats Co., Ltd.) at a temperature of 230° C. by the use of a 50-mmφ extruder in order to prepare a modified olefin polymer containing a maleic anhydride additive amount of 0.15% by weight (F', G' and H').

A predetermined amount of magnesium hydroxide (trade name: Kisuma 5B; Kyowa Chemical Co., Ltd.) as a flame retarder was added to 100 parts by weight of a resinous component comprising predetermined amounts of the above mentioned components (a) and (b) in order to prepare a composition, for which physial properties were evaluated. The results are set forth in Table 1.

EXAMPLES 1 to 3 AND COMPARATIVE EXAMPLES 1 to 4

As a component (a), an ethylene-α-olefin copolymer (A) was used, and the influence of amounts of an unmodified olefin polymer and a modified olefin polymer was observed.

As a result, when the amount of the modified polyolefin was less than the range of the present invention, tensile strength was small, heat deformation rate was large, and heat resistance was poor. On the other hand, when the amount was too large, mechanical strengths such as tensile strength and elongation were lowered, and the effect of the improvement was insufficient. In contrast, in the case of the present invention, mechanical strengths such as tensile strength and elongation and heat resistance (heat deformation rate) were largely improved. Further, in the case that a component (b) was the unmodified olefin polymer, tensile strength, elongation and heat resistance were scarcely improved.

EXAMPLES 4 to 7 AND COMPARATIVE EXAMPLES 5 and 6

In Examples 4 and 5, an ethylene-α-olefin which was a component (a) of the present invention was exchanged, and in Examples 6 and 7, a modified olefin polymer which was a component (b) was altered in order to observe results due to such alterations, but in all of these examples, a great improvement was achieved as in Examples 2 and 3.

On the contrary, in Comparative Examples 5 and 6, the component (a) of the present invention was replaced with a rubber series ethylene-α-olefin copolymer. As a result, tensile strength, elongation and heat resistance all were remarkably poor.

EXAMPLE 8 AND COMPARATIVE EXAMPLES 7 and 8

In Example 8 and Comparative Examples 7 and 8, the influence of an amount of an inorganic flame retarder (magnesium hydroxide) was observed.

As a result, in the case that the amount of the inorganic flame retarder was less than the range of the present invention, an oxygen index was small and a flame-retardant effect was poor, and in the case it was more than the range thereof, mechanical strengths such as tensile strength and elongation were remarkably lowered.

As be apparent from the foregoing, in the composition of the present invention, the enhancement in mechanical strengths such as tensile strength and elongation as well as the improvement in heat resistance and flame resistance were clearly well balanced.

EXAMPLE 9

The procedure in Example 2 was repeated with the exception that magnesium hydroxide which was a flame retarder in Example 2 was replaced with 130 parts by weight of aluminum hydroxide (trade name: Higilite H-42M; Nippon Light Metal Co., Ltd.), and the evaluated results are set forth in Table 1. The results indicate that tensilve strength, elongation and heat resistance were improved remarkably.

COMPARATIVE EXAMPLE 9

A resin (G) which was the component (b), i.e., a linear low-density polyethylene (ethylene-butene-1 copolymer) was used, and evaluation was carried out as in Example 6. The obtained results are set forth in Table 1. They indicate that flexiblity, low-temperature brittleness were very bad.

EXAMPLE 10

In this example, UL-94 test was carried out to look for a higher flame retardance (self-extinguishing properties). That is, predetermined amounts of a derivative of tetrabromobisphenol A (trade namde: Fireguard 3003; Teijin Chemical Co., Ltd.) as a halogen series flame retarder and antimony trioxide (Sb$_2$O$_3$) as a flame-retardant auxiliary were mixed with predetermined amounts of the same components (a), (b) and (c) as in Example 1. For the resultant composition, physical properties such as flame retardance, tensile strength and the like were measured. The results are set forth in Table 2.

In consequence, in Samples 1 to 5 in which a ratio of the halogen series flame retarder: the flame-retardant auxiliary was in the range of 5:1 to 1:3, no dropping of a fire chip occurred, and the V-0 success in the UL-94 test was obtained. In addition, all the compositions in these samples were good in mechanical strengths such as tensile strength and elongation, and in short, they maintained an adequate property balance.

As seen in Samples 6 and 7, however, in the case that the ratio of the halogen flame retarder: the flame-retardant auxiliary was outside the range of 5:1 to 1:3, it was difficult to obtain the composition having balanced mechanical strengths and a higher flame retardance (self-extingushing properties).

Further, in the cases of Samples 8 and 9 in which an amount of the inorganic flame retarder was outside the range of the present invention, both the mechanical strengths and the self-extinguishing properties were bad and insufficient.

In Samples 10 and 11, magnesium hydroxide was replaced with talc (trade name: Talc 13R; Asada Flour Milling Co., Ltd.) and calcium carbonate (trade name: Calcium Carbonate #1010; Nitto Powdering Co., Ltd.), and evaluation was then made. Both of these samples did not succeed in V-0 in the UL-94 test.

In Reference Example 1, a modified olefin polymer which was the component (b) of the present invention was not blended. As a result of its evaluation, the dropping of a fire chip was seen, and V-1 could not be satisfied.

EXAMPLE 11

In this example, a polyethylene cable insulator i.e., sheath which was an electrical material was prepared in accordance with quality standards of JIS C3604, JIS C3605 and JIS C3606.
(1) JIS C3604-1971 (Polyethylene Insulated Cable)
(2) JIS C3605-1981 (600 V Polyethylene Insulated Cable and 600 V Cross-linked Polyethylene Insulated Cable)
(3) JIS C3606-1981 (High-Voltage Cross-linked Polyethylene Insulated Cable)
One example of the quality standards of the above mentioned JIS C3604, C3605 and C3606 is as follows:

| Abstract of Quality Standards JIS C3604, C3605 and C3606 | |
|---|---|
| Item | Characteristics |
| Tensile Strength | 1.0 kgf/mm$^2$ (9.8 MPa) or more |
| Elongation | 350% or more |

That is, a copolymer of ethylene and propylene or butene-1 which were different in melt index was prepared in the same manner as in Example 1, and the thus prepared copolymer was blended with the components (b), (c) and (d). The manufactured article was evaluated for tensile strength and elongation regarding applicability as a polyethylene insulator or sheath for an electric cable (measurement was made in accordance with JIS C3005). The results are set forth in Table 3.

As a result, Sample Nos. 3 and 8 could not satisfy the quality standards of the above mentioned JIS C3604 to C3606 in point of tensile strength. Therefore, it was found desirable that the melt index of the ethylene-α-olefin copolymer which was the component (a) was 5 g/10 minutes or less for the sake of a polyethylene cable insulator or sheath which was one electrical material.

Incidentally, the procedures of the respective tests were as follows:
1. Tensile Strength and Elongation No. 3 dumbbells formed by punching a sheet having a thickness of 1 mm were used as specimens, and measurement was carried out by the use of Tensilone at a tensile rate of 200 mm/min.
2. Heat Resistance (heat deformation)

Deformation was measured by applying a load of 2.64 kg to a sample column having a thickness of 6 mm and a diameter of 10 mm for 30 minutes in an oil bath at 100° C.
3. Oxygen Index (O.I.)

It was carried out in accordance with D.2863-ASTM $$O.I = (\text{Oxygen flow rate}) / (\text{Oxygen flow rate}) + (\text{Nitrogen flow rate}) \times 100$$

A minimum oxygen concentration necessary to continuously burn a sample for 3 minutes or more, or necessary for to continuously burn 50 mm or more of the sample.
4. Flame Retardance (on the basis of UL-94 test)

A specimen having a length of 127 mm, a width of 12.7 mm and a thickness of 1.6 mm (officially 1/16 inch) was put in a flame for 10 seconds and was then taken out therefrom, and its combustion time and red heat time were measured. After the flame on the specimen was put out, it was further put in the flame for 10 seconds and then taken out therefrom, and the combustion time and red heat time were measured again.
(i) V-0 Success "V-0 success" means that an average self-extinguishing time is 5 seconds or less, a maximum self-extinguishing time is 10 seconds or less, and cotton does not burn up by a dropped fire chip.
(ii) V-1 Success "V-1 success" means that an average self-extinguishing time is 25 seconds or less, a maximum self-extinguishing time is 30 seconds or less, and a specimen cotton which is placed 12 cm under a flame does not burn up by a dropped fire chip.
5. Low-temperature Britleness A test was carried out in accordance with JIS K6760. The occurrence of a fine crack was regarded as the breakage of a sample.

TABLE 1-1

(Evaluation of Physical Properties)

| | Ethylene-α-Olefin Copolymer | | | | |
|---|---|---|---|---|---|
| | Kind | MI (g/10 min) | Density (g/cm$^3$) | DSC (°C.) | n-C$_6$ Insoluble (wt %) | Amount (wt parts) |
| Example | | | | | | |
| 1 | A | 1.0 | 0.905 | 121 | 90 | 95 |
| 2 | A | 1.0 | 0.905 | 121 | 90 | 90 |
| 3 | A | 1.0 | 0.905 | 121 | 90 | 80 |
| 4 | B | 0.8 | 0.900 | 120 | 80 | 80 |
| 5 | C | 0.5 | 0.890 | 121 | 60 | 80 |
| 6 | A | 1.0 | 0.905 | 121 | 90 | 90 |
| 7 | B | 0.8 | 0.900 | 120 | 80 | 90 |
| 8 | B | 0.8 | 0.900 | 120 | 80 | 90 |
| 9 | A | 1.0 | 0.905 | 120 | 90 | 90 |
| Comparative Example | | | | | | |
| 1 | A | 1.0 | 0.905 | 121 | 90 | 100 |

TABLE 1-1-continued (Evaluation of Physical Properties)
Ethylene-α-Olefin Copolymer

|   | Kind | MI (g/10 min) | Density (g/cm$^3$) | DSC (°C.) | n-C$_6$ Insoluble (wt %) | Amount (wt parts) |
|---|---|---|---|---|---|---|
| 2 | A | 1.0 | 0.905 | 121 | 90 | 99.5 |
| 3 | A | 1.0 | 0.905 | 121 | 90 | 55 |
| 4 | A | 1.0 | 0.905 | 121 | 90 | 90 |
| 5 | D (Toughmer) | 4 | 0.887 | 67 | 0 | 90 |
| 6 | E (EPR) | 1.9 | 0.86 | 33 | 0 | 90 |
| 7 | A | 1.0 | 0.905 | 121 | 90 | 90 |
| 8 | A | 1.0 | 0.905 | 121 | 90 | 90 |
| 9 | G | 1.0 | 0.922 | 122 | 98 | 90 |

TABLE 1-2

|  | Modified Olefin Polymer | | | | Flame Retarder | |
|---|---|---|---|---|---|---|
|  | Kind | MI (g/10 min) | Density (g/cm$^3$) | Amount (wt parts) | Kind | Amount (wt parts) |
| Example | | | | | | |
| 1 | F' | 0.3 | 0.935 | 5 | Mg(OH)$_2$ | 100 |
| 2 | F' | 0.3 | 0.935 | 10 | " | 100 |
| 3 | F' | 0.3 | 0.935 | 20 | " | 100 |
| 4 | F' | 0.3 | 0.935 | 20 | " | 100 |
| 5 | H' | 0.6 | 0.956 | 20 | " | 100 |
| 6 | G' | 0.4 | 0.922 | 10 | " | 100 |
| 7 | H' | 0.6 | 0.956 | 10 | " | 100 |
| 8 | F' | 0.3 | 0.935 | 10 | " | 130 |
| 9 | F' | 0.3 | 0.935 | 10 | Al(OH)$_3$ | 130 |
| Comparative Example | | | | | | |
| 1 | — | — | — | — | Mg(OH)$_2$ | 100 |
| 2 | F' | 0.3 | 0.935 | 0.5 | " | 100 |
| 3 | F' | 0.3 | 0.935 | 45 | " | 100 |
| 4 | F (unmodified) | 0.8 | 0.935 | 10 | " | 100 |
| 5 | F' | 0.3 | 0.935 | 10 | " | 100 |
| 6 | F' | 0.3 | 0.935 | 10 | " | 100 |
| 7 | F' | 0.3 | 0.935 | 10 | " | 15 |
| 8 | F' | 0.3 | 0.935 | 10 | " | 210 |
| 9 | G' | 0.4 | 0.922 | 10 | " | 100 |

TABLE 1-3

|  | Tensile Strength (kg/cm$^2$) Elongation (%) | Heat Deformation (%) | Oxygen Index (-) | Flexibility | Britleness at Low-Temp (°C.) |
|---|---|---|---|---|---|
| Example | | | | | |
| 1 | 1.37/710 | 15 | 25 | Good | −40 |
| 2 | 1.54/780 | 11 | 25 | " | " |
| 3 | 1.56/810 | 7 | 25 | " | " |
| 4 | 1.63/820 | 11 | 25 | " | " |
| 5 | 1.54/760 | 10 | 25 | " | −35 |
| 6 | 1.47/770 | 16 | 25 | " | −40 |
| 7 | 1.43/750 | 12 | 25 | " | " |
| 8 | 1.29/680 | 14 | 27 | " | " |
| 9 | 1.55/760 | 11 | 27 | " | " |
| Comparative Example | | | | | |
| 1 | 1.08/670 | 23 | 25 | " | −40 |
| 2 | 1.09/670 | 21 | 25 | " | " |
| 3 | 1.12/430 | 2 | 25 | " | " |
| 4 | 1.13/650 | 21 | 25 | " | " |
| 5 | 0.91/610 | >30 | 25 | " | −50 |
| 6 | 1.07/630 | >30 | 25 | " | −60 |
| 7 | 1.60/930 | 23 | 18 | " | <−70 |
| 8 | 0.57/35 | 10 | 35 | Bad | −5 |
| 9 | 1.38/700 | 0 | 25 | Bad | −20 |

TABLE 2-1

(Evaluation of Physical Properties)
(a) Ethylene-α-Olefin Copolymer

|  | Kind | MI (g/10 min) | Density (g/cm$^3$) | DSC (°C.) | n-C$_6$ Insoluble (wt %) | Amount (wt parts) |
|---|---|---|---|---|---|---|
| Sample | | | | | | |
| 1 | A | 1.0 | 0.905 | 121 | 90 | 90 |
| 2 | A | 1.0 | 0.905 | 121 | 90 | 90 |
| 3 | B | 0.8 | 0.900 | 120 | 80 | 94 |
| 4 | C | 0.5 | 0.890 | 121 | 60 | 90 |
| 5 | A | 1.0 | 0.905 | 121 | 90 | 90 |
| 6 | A | 1.0 | 0.905 | 121 | 90 | 90 |
| 7 | A | 1.0 | 0.905 | 121 | 90 | 90 |
| 8 | A | 1.0 | 0.905 | 121 | 90 | 90 |
| 9 | B | 0.8 | 0.900 | 120 | 80 | 94 |
| 10 | B | 0.8 | 0.900 | 120 | 80 | 90 |
| 11 | B | 0.8 | 0.900 | 120 | 80 | 90 |
| Reference Sample | | | | | | |
| 1 | A | 1.0 | 0.905 | 121 | 90 | 100 |

TABLE 2-2

| | (b) Modified Olefin Polymer | | | | (c) Inorg. Flame Retarder | |
|---|---|---|---|---|---|---|
| | Kind | MI (g/10 min) | Density (g/cm³) | Amount (wt parts) | Kind | Amount (wt parts) |
| Sample | | | | | | |
| 1 | F' | 0.3 | 0.935 | 10 | Mg(OH)₂ | 80 |
| 2 | F' | 0.3 | 0.935 | 10 | " | 50 |
| 3 | F' | 0.3 | 0.935 | 6 | " | 70 |
| 4 | H' | 0.6 | 0.956 | 10 | " | 50 |
| 5 | G' | 0.4 | 0.922 | 10 | " | 70 |
| 6 | F' | 0.3 | 0.935 | 10 | " | 70 |
| 7 | F' | 0.3 | " | 10 | " | 70 |
| 8 | F' | 0.3 | " | 10 | " | 15 |
| 9 | F' | 0.3 | " | 6 | " | 210 |
| 10 | F' | 0.3 | " | 10 | Talc | 70 |
| 11 | F' | 0.3 | " | 10 | CaCO₃ | 70 |
| Reference Sample | | | | | | |
| 1 | — | — | — | — | Mg(OH)₂ | 80 |

TABLE 2-3

| | (d) Organic Flame Retarder | | | Physical Properties | | |
|---|---|---|---|---|---|---|
| | Fire Guard (wt parts) | Sb₂O₃ (wt parts) | MI (g/10 min) | Tensile Strength (kg/mm²) | Elongation (%) | UL-94 Test |
| Sample | | | | | | |
| 1 | 20 | 10 | 0.5 | 1.20 | 730 | V-0 Success |
| 2 | 30 | 15 | 0.6 | 1.25 | 760 | " |
| 3 | 25 | 13 | 0.3 | 1.28 | 770 | " |
| 4 | 30 | 15 | 0.2 | 1.32 | 790 | " |
| 5 | 25 | 13 | 0.5 | 1.22 | 740 | " |
| 6 | 25 | 4 | 0.5 | 1.20 | 740 | V-1 Failure |
| 7 | 6 | 20 | 0.4 | 1.23 | 750 | " |
| 8 | 30 | 15 | 0.9 | 1.36 | 810 | V-1 Failure |
| 9 | 20 | 10 | 0.1 | 0.71 | 350 | V-0 Success |
| 10 | 25 | 13 | 0.5 | 0.92 | 320 | V-1 Failure |
| 11 | 25 | 13 | 0.5 | 0.90 | 310 | V-1 Failure |
| Reference Sample | | | | | | |
| 1 | 20 | 10 | 0.8 | 1.02 | 670 | V-1 Failure |

TABLE 3-1

| | (Evaluation of Physical Properties) (a) Ethylene-α-Olefin Copolymer | | | | | |
|---|---|---|---|---|---|---|
| | Kind of Olefin | MI (g/10 min) | Density (g/cm³) | DSC (°C.) | n-C₆ Insoluble (wt %) | Amount (wt parts) |
| Sample | | | | | | |
| 1 | Propylene | 0.5 | 0.890 | 121 | 60 | 90 |
| 2 | " | 3 | 0.900 | 123 | 80 | 90 |
| 3 | " | 6 | 0.910 | 124 | 90 | 90 |
| 4 | Butene-1 | 0.8 | 0.900 | 120 | 80 | 90 |
| 5 | " | 3 | 0.905 | 121 | 90 | 90 |
| 6 | Propylene | 0.5 | 0.890 | 121 | 60 | 90 |
| 7 | " | 3 | 0.900 | 123 | 80 | 90 |
| 8 | " | 6 | 0.910 | 124 | 90 | 90 |
| 9 | Butene-1 | 0.8 | 0.900 | 120 | 80 | 90 |
| 10 | " | 3 | 0.905 | 121 | 90 | 90 |

TABLE 3-2

| | (b) Modified Olefin Polymer | | | | (c) Inorg. Flame Retarder | |
|---|---|---|---|---|---|---|
| | Kind | MI (g/10 min) | Density (g/cm³) | Amount (wt parts) | Kind | Amount (wt parts) |
| Sample | | | | | | |
| 1 | F' | 0.3 | 0.935 | 10 | Mg(OH)₂ | 100 |
| 2 | F' | 0.3 | 0.935 | 10 | " | 100 |
| 3 | F' | 0.3 | 0.935 | 10 | " | 100 |
| 4 | F' | 0.3 | 0.935 | 10 | " | 100 |
| 5 | F' | 0.3 | 0.935 | 10 | " | 100 |
| 6 | F' | 0.3 | 0.935 | 10 | " | 70 |
| 7 | F' | 0.3 | 0.935 | 10 | " | 70 |
| 8 | F' | 0.3 | 0.935 | 10 | " | 70 |
| 9 | F' | 0.3 | 0.935 | 10 | " | 70 |
| 10 | F' | 0.3 | 0.935 | 10 | " | 70 |

TABLE 3-3

| | (d) Organic Flame Retarder | | | | Physical Properties | | | |
|---|---|---|---|---|---|---|---|---|
| | Kind | Amount (wt parts) | Sb₂O₃ (wt parts) | MI (g/10 min) | Tensile Strength (kg/mm²) | Elongation (%) | Oxygen Index | UL-94 Test |
| Example | | | | | | | | |
| 1 | — | — | — | — | 1.48 | 750 | 25 | — |
| 2 | — | — | — | — | 1.07 | 730 | 25 | — |
| 3 | — | — | — | — | 0.73 | 640 | 25 | — |
| 4 | — | — | — | — | 1.55 | 780 | 25 | — |
| 5 | — | — | — | — | 1.08 | 730 | 25 | — |
| 6 | Fire | 25 | 13 | 0.1 | 1.27 | 770 | — | V-0 Success |

TABLE 3-3-continued

| | (d) Organic Flame Retarder | | | Physical Properties | | | |
| --- | --- | --- | --- | --- | --- | --- | --- |
| | Kind | Amount (wt parts) | Sb$_2$O$_3$ (wt parts) | MI (g/10 min) | Tensile Strength (kg/mm$^2$) | Elongation (%) | Oxygen Index | UL-94 Test |
| 7 | Fire Guard 3003 | 25 | 13 | 1.3 | 1.03 | 740 | — | " |
| 8 | Fire Guard 3003 | 25 | 13 | 2.8 | 0.71 | 660 | — | " |
| 9 | Fire Guard 3003 | 25 | 13 | 0.3 | 1.29 | 770 | — | " |
| 10 | Fire Guard 3003 | 25 | 13 | 1.3 | 1.04 | 740 | — | " |

As be definite from the foregoing, since the flame-retardant composition of the present invention is composed particularly of the combination of the ethylene-α-olefin copolymer having a density of 0.86 to 0.91 g/cm$^3$, a boiling n-hexane insoluble matter of 10% by weight and a maximum peak of 100° C. or more on the basis of a differential scanning calorie measurement and the inorganic flame retarder, the receivable filling content of the inorganic flame retarder can be heightened, whereby the flame-retardant effect can be enhanced. In addition, since the olefin polymer modified with the unsaturated carboxylic acid or its derivative is suitably blened therewith, mechanical strength and heat resistance can be improved remarkably. Further, by the use of a hydrate of the inorganic metallic compound as the flame retarder, for example, aluminum hydroxide, magnesium hydroxide or the like, the generation of a harmful gas can be inhibited in the time of combustion. Therefore, the present invention can provide a less-flame and non-environmental pollution type flame-retardant composition which can meet the recent needs of the highly flame-retardant materials.

Moreover, since the composition of the present invention is excellent in electrical properties, it can be utilized as electrical materials, for example, electrical insulators and outer covering materials for electric wires, cables and the like. In particular, the composition of the present invention can be utilized as insulators for cables in a variety of electric power generation plants such as atomic energy laboratories in which an amount of a corrosive gas is limited and other power stations; as insulators for cables and fire resistant electrical wires in plants of chemicals, steel manufacture, petroleum and the like; and as insulators for electric wires in usual houses. In short, it is fair to say that the flame-retardant composition of the present invention can be properly employed as electrical insulators in places where the highly flame-retardant properties are required.

In addition thereto, the applicable range of the composition according to the present invention can cover articles such as films, sheets and pipes molded by extrusion and injection, and master batches, as well as panels, packing materials, furniture and household articles in various fields such as fiber, electricity, electron, automobiles, shipbuilding, aircrafts, building and civil engineering.

What is claimed is:

1. A flame-retardant olefin polymer composition comprising at least components (a), (b) and (c) in which in 100 parts by weight of a resin component which is composed of
  (a) 99 to 60% by weight of an ethylene-α-olefin copolymer having a density of 0.86 to 0.91 g/cm$^3$, a boiling n-hexane insoluble matter of 10% by weight or more and a maximum peak temperature of 100° C. or more in terms of differential scanning calorie meter and
  (b) 1 to 40% by weight of an olefin polymer modified with an unsaturated carboxylic acid or its derivative;
  (c) 20 to 200 parts by weight of an inorganic flame retarder is contained.

2. A flame-retardant olefin polymer composition according to claim 1 wherein (d) an organic flame retarder comprising a halogen series compound and a flame-retardant auxiliary of antimony trioxide or antimony pentoxide are used together with said composition, a weight ratio of said organic flame retarder: said flame-retardant auxiliary being within the range of 5:1 to 1:3, the total amount of both being 100 parts by weight or less.

3. A flame-retardant olefin polymer composition according to claim 1 wherein said olefin polymer which is the component (b) is an ethylene-α-olefin copolymer having a density of 0.91 to 0.97 g/cm$^3$.

4. A flame-retardant olefin polymer composition according to claim 1 wherein an amount of said unsaturated carboxylic acid or its derivative is within the range of 0.05 to 10% by weight based on the weight of said olefin polymer which is the component (b).

5. A flame-retardant olefin polymer composition according to claim 1 wherein said unsaturated carboxylic acid or its derivative for modifying said olefin polymer which is the component (b) is maleic anhydride.

6. A flame-retardant olefin polymer composition according to claim 1 wherein said inorganic flame retarder which is the component (c) is a hydrate of an inorganic metallic compound.

7. A flame-retardant olefin polymer composition according to claim 5 wherein said hydrate of the inorganic metallic compound is aluminum hydroxide, magnesium hydroxide or a mixture thereof.

8. An insulated electrical conductive material having as the insulating protective cover a flame-retardant olefin polymer composition comprising at least components (a), (b) and (c) in which in 100 parts by weight of a resin component which is composed of (a) 99 to 60% by weight of an ethylene-α-olefin copolymer having a density of 0.86 to 0.91 g/cm³, a boiling n-hexane insoluble matter of 10% by weight or more and a maximum peak temperature of 100° C. or more in terms of differential scanning calorie meter and (b) 1 to 40% by weight of an olefin polymer modified with an unsaturated carboxylic acid or its derivative;

(c) 20 to 200 parts by weight of an inorganic flame retarder is contained.

9. An insulated electrical conductive material according to claim 8 wherein (d) an organic flame retarder comprising a halogen series compound and a flame-retardant auxiliary of antimony trioxide or antimony pentoxide are used together with said composition, a weight ratio of said organic flame retarder: said flame-retardant auxiliary being within the range of 5:1 to 1:3, the total amount of both being 100 parts by weight or less.

10. An insulated electrical conductive material according to claim 8 wherein said ethylene-α-olefin which is the component (a) has a melt index of 0.3 to 5 g/10 min.

11. An insulated electrical conductive material according to claim 8 wherein said olefin polymer which is the component (b) is an ethylene-α-olefin copolymer having a melt index of 0.1 to 5 g/10 min and a density of 0.91 to 0.97 g/cm³.

12. An insulated electrical conductive material according to claim 8 wherein an amount of said unsaturated carboxylic acid or its derivative based on the weight of said olefin polymer which is the component (b) is within the range of 0.05 to 10% by weight.

13. An insulated electrical conductive material according to claim 8 wherein said unsaturated carboxylic acid or its derivative for said component (b) is maleic anhydride.

14. An insulated electrical conductive material according to claim 8 wherein said flame redarder which is the component (c) is a hydrate of an inoganic metallic compound.

15. An insulated electrical conductive material according to claim 14 wherein said hydrate of the inorganic metallic compound is aluminum hydroxide or magnesium hydroxide.

16. An insulated electrical conductive material according to claim 8 wherein said electrical material is an insulator or a sheath for electric wires or electric cables.

17. An insulated electrical conductive material according to claim 8 wherein said electrical material is an electrical insulating protective or guarding article for an insulating plastic sheet, an insulating garment, a cable protecting cover, a packing material or a protective pipe.

* * * * *